(12) United States Patent
Salter et al.

(10) Patent No.: US 12,436,603 B2
(45) Date of Patent: Oct. 7, 2025

(54) AUDIENCE ENGAGEMENT FOR PLACEMENT OF CONTENT IN AN HMD

(71) Applicant: Apple Inc., Cupertino, CA (US)

(72) Inventors: Thomas G Salter, San Francisco, CA (US); Anshu K. Chimalamarri, Sunnyvale, CA (US); Brian W. Temple, Santa Clara, CA (US); Paul Ewers, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/578,777

(22) PCT Filed: Aug. 22, 2022

(86) PCT No.: PCT/US2022/041005
§ 371 (c)(1),
(2) Date: Jan. 12, 2024

(87) PCT Pub. No.: WO2023/038781
PCT Pub. Date: Mar. 16, 2023

(65) Prior Publication Data
US 2024/0338160 A1 Oct. 10, 2024

Related U.S. Application Data

(60) Provisional application No. 63/242,285, filed on Sep. 9, 2021.

(51) Int. Cl.
*G06F 3/01* (2006.01)
(52) U.S. Cl.
CPC .................................. *G06F 3/011* (2013.01)

(58) Field of Classification Search
CPC .............................. G06F 3/011; G06F 3/0481
See application file for complete search history.

(56) References Cited

U.S. PATENT DOCUMENTS

| 10,921,605 B2 | 2/2021 | Reyes et al. | |
| 2015/0261387 A1* | 9/2015 | Petersen | H04M 1/576 715/765 |
| 2018/0093185 A1* | 4/2018 | Black | A63F 13/26 |

(Continued)

FOREIGN PATENT DOCUMENTS

WO 2021061449 A1 4/2021

OTHER PUBLICATIONS

PCT International Search Report and Written Opinion dated Dec. 9, 2022, PCT International Application No. PCT/US2022/041005, pp. 1-10.

*Primary Examiner* — Liliana Cerullo
(74) *Attorney, Agent, or Firm* — Fernando & Partners, LLP

(57) ABSTRACT

Various implementations disclosed herein include devices, systems, and methods for displaying presentation notes at varying positions within a presenter's field of view. In some implementations, a device includes a display, one or more processors, and a memory. A first portion of a media content item corresponding to a presentation is displayed at a first location in a three-dimensional environment. Audience engagement data corresponding to an engagement level of a member of an audience is received. A second portion of the media content item is displayed at a second location in the three-dimensional environment. The second location is selected based on the audience engagement data.

20 Claims, 11 Drawing Sheets

(56) References Cited

U.S. PATENT DOCUMENTS

| | | |
|---|---|---|
| 2019/0068529 A1 | 2/2019 | Mullins |
| 2021/0342575 A1* | 11/2021 | Nagar .................. G06V 10/764 |
| 2022/0012989 A1* | 1/2022 | Kurien ................... G06F 3/011 |
| 2023/0156124 A1* | 5/2023 | Li ....................... H04L 12/1818 |
| | | 709/204 |

* cited by examiner

AUDIENCE ENGAGEMENT FOR PLACEMENT OF CONTENT IN AN HMD

CROSS-REFERENCE TO RELATED APPLICATION

This application claims the benefit of U.S. Provisional Patent App. No. 63/242,285, filed on Sep. 9, 2021, which is incorporated by reference in its entirety.

TECHNICAL FIELD

The present disclosure generally relates to displaying media content items.

BACKGROUND

Some devices are capable of generating and presenting graphical environments that include many objects. These objects may mimic real world objects. These environments may be presented on mobile communication devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
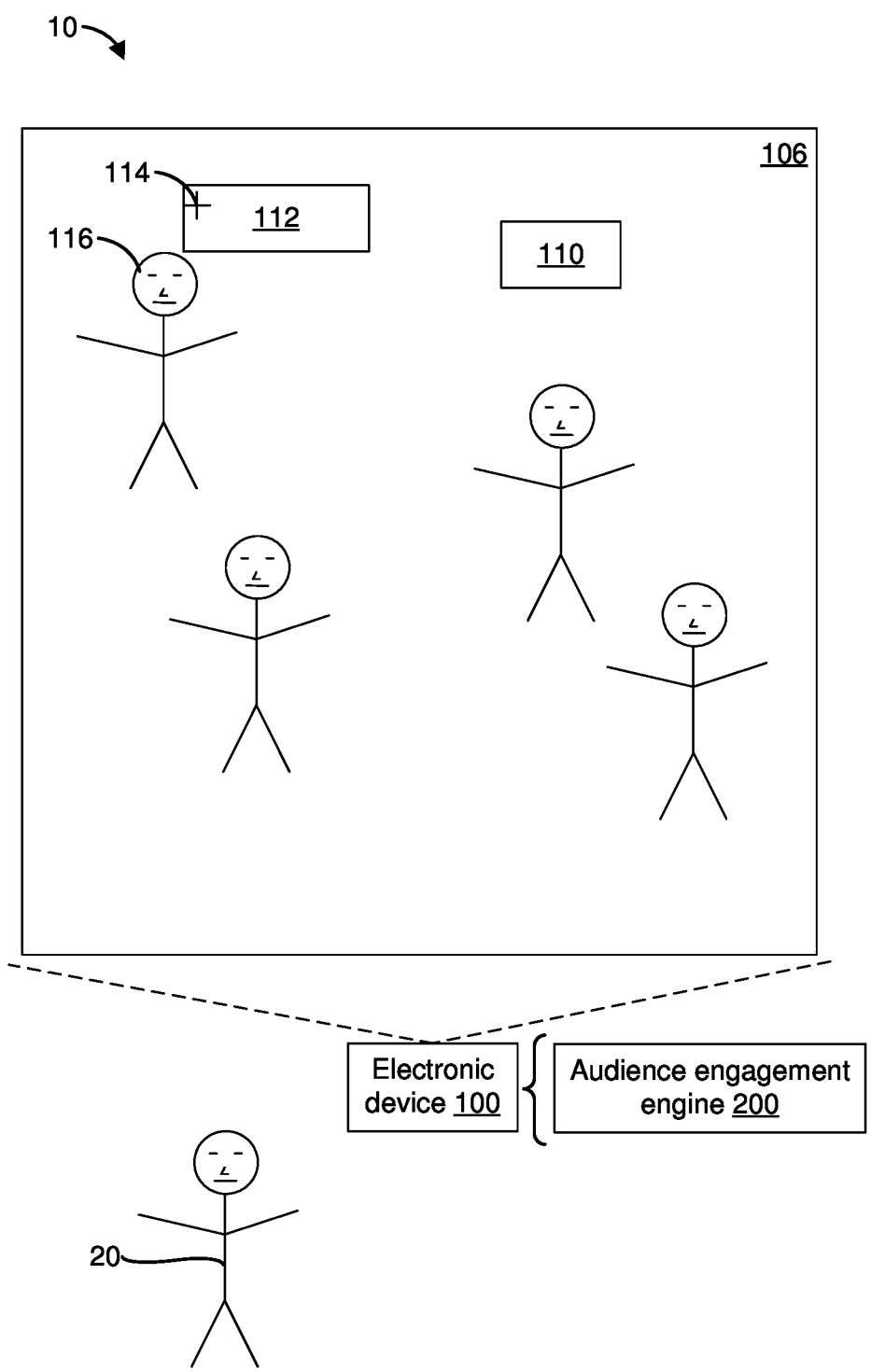
FIGS. 1A-1G are diagrams of an example operating environment in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for displaying presentation notes at varying positions within a presenter's field of view: In some implementations, a device includes a display, one or more processors, and a memory. A first portion of a media content item corresponding to a presentation is displayed at a first location in a field of view of a user. Audience engagement data corresponding to an engagement level of a member of an audience is received. A second portion of the media content item is displayed at a second location in the field of view of the user. The second location is selected based on the audience engagement data.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants may not include all of the specific details described herein. Moreover, well-known systems, methods, components, devices, and circuits have not been described in exhaustive detail so as not to obscure more pertinent aspects of the example implementations described herein.

Some devices display an extended reality (XR) environment that includes one or more objects, e.g., virtual objects. A device may be used to display a media content item, such as presentation notes. Some devices cause the media content item to appear at a fixed location in a user's field of view, e.g., in front of the user, towards a bottom of the user's field of view; towards a right of the user's field of view, etc. This can cause the user's eye and/or head position to become fixed as the user views the media content item. Other persons viewing the user while the media content item is displayed (e.g., an audience viewing a user who is watching the media content item through a head-mountable device) may observe the user's eyes and/or head in the fixed position and become disengaged from the user.

The present disclosure provides methods, systems, and/or devices for displaying portions of a media content item, e.g., presentation notes, at varying positions within a user's field of view. In various implementations, a method includes displaying a first portion of a media content item corresponding to a presentation at a first location in the field of view. Audience engagement data is received that corresponds to an engagement level of a member of an audience. A second portion of the media content item is then displayed at a second location in the field of view. The second location is selected based on the audience engagement data. The second location may be selected to cause the user to look around the audience while speaking, potentially increasing the audience's engagement with the presenter.

FIG. 1A is a block diagram of an example operating environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 10 includes an electronic device 100 and an audience engagement engine 200. In some implementations, the electronic device 100 includes a handheld computing device that can be held by a user 20. For example, in some implementations, the electronic device 100 includes a smartphone, a tablet, a media player, a laptop, or the like. In some implementations, the electronic device 100 includes a wearable computing device that can be worn by the user 20. For example, in some implementations, the electronic device 100 includes a head-mountable device (HMD) or an electronic watch.

In the example of FIG. 1A, the audience engagement engine 200 resides at the electronic device 100. For example, the electronic device 100 implements the audience engagement engine 200. In some implementations, the electronic device 100 includes a set of computer-readable instructions corresponding to the audience engagement engine 200. Although the audience engagement engine 200 is shown as being integrated into the electronic device 100, in some implementations, the audience engagement engine 200 is separate from the electronic device 100. For example, in some implementations, the audience engagement engine 200 resides at another device (e.g., at a controller, a server or a cloud computing platform).

As illustrated in FIG. 1A, in some implementations, the electronic device 100 presents an extended reality (XR) environment 106 that includes (e.g., corresponds to) a field of view of the user 20. In some implementations, the XR environment 106 is referred to as a computer graphics environment. In some implementations, the XR environment 106 is referred to as a graphical environment. In some implementations, the electronic device 100 generates the XR environment 106. Alternatively, in some implementations, the electronic device 100 receives the XR environment 106 from another device that generated the XR environment 106.

In some implementations, the XR environment 106 includes a virtual environment that is a simulated replacement of a physical environment. In some implementations, the XR environment 106 is synthesized by the electronic device 100. In such implementations, the XR environment 106 is different from a physical environment in which the electronic device 100 is located. In some implementations, the XR environment 106 includes an augmented environment that is a modified version of a physical environment. For example, in some implementations, the electronic device 100 modifies (e.g., augments) the physical environment in which the electronic device 100 is located to generate the XR environment 106. In some implementations, the electronic device 100 generates the XR environment 106 by simulating a replica of the physical environment in which the electronic device 100 is located. In some implementations, the electronic device 100 generates the XR environment 106 by removing and/or adding items from the simulated replica of the physical environment in which the electronic device 100 is located.

In some implementations, the XR environment 106 includes various virtual objects such as an XR object 110 ("object 110", hereinafter for the sake of brevity). In some implementations, the XR environment 106 includes multiple objects. In some implementations, the virtual objects are referred to as graphical objects or XR objects. In various implementations, the electronic device 100 obtains the objects from an object datastore (not shown). For example, in some implementations, the electronic device 100 retrieves the object 110 from the object datastore. In some implementations, the virtual objects represent physical articles. For example, in some implementations, the virtual objects represent equipment (e.g., machinery such as planes, tanks, robots, motorcycles, etc.). In some implementations, the virtual objects represent fictional elements (e.g., entities from fictional materials, for example, an action figure or a fictional equipment such as a flying motorcycle).

In various implementations, the electronic device 100 (e.g., the audience engagement engine 200) displays a first portion 112 of a media content item that corresponds to a presentation. For example, the first portion 112 may comprise an image or a text portion (e.g., notes) that prompts the user 20 to speak a first portion of a prepared lecture. The electronic device 100 displays the first portion 112 at a first location 114 in a field of view of the user 20. In some implementations, the electronic device 100 selects the first location 114 based on a location of a member 116 of an audience. The electronic device 100 may determine the location of the member 116 of the audience based on an image representing the audience. For example, the electronic device 100 may incorporate an image sensor that captures an image comprising a plurality of pixels. The electronic device 100 may determine that a subset of the pixels represents the member 116 of the audience and may select the first location 114 based on the location of the subset of pixels.

Figure 1B:
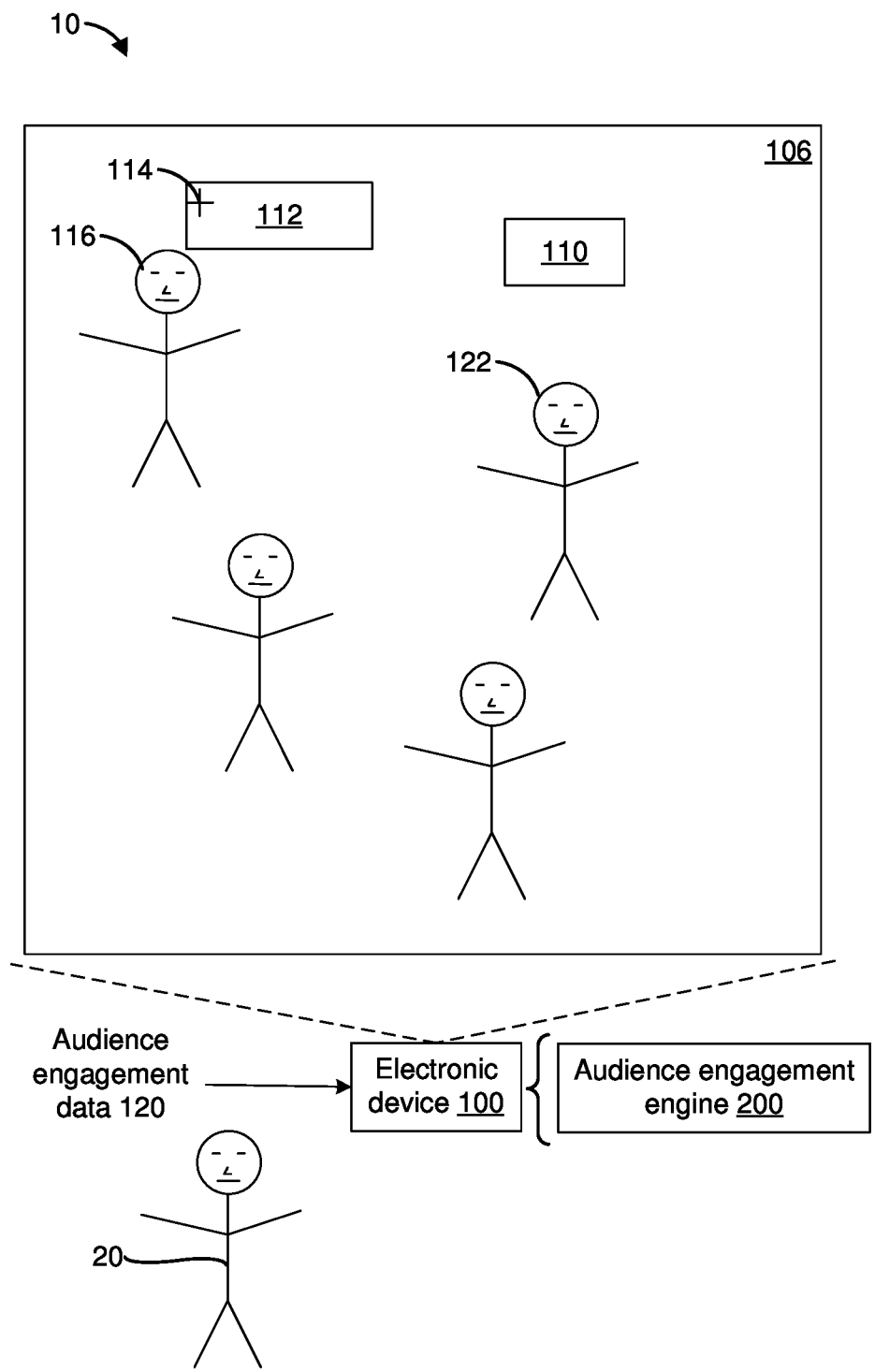

As represented in FIG. 1B, in various implementations, the electronic device 100 (e.g., the audience engagement engine 200) receives audience engagement data 120. The audience engagement data 120 corresponds to an engagement level of a member of the audience and may include image data received from an image sensor, audio signal data received from an audio sensor, user input data received from a user input device, and the like. For example, the electronic device 100 may process image data to derive data indicative of facial expressions and/or body poses exhibited by members of the audience. Similarly, the electronic device 100 may process audio signal data to derive data indicative of utterances exhibited by members of the audience. In some implementations, the audience engagement data corresponds to the engagement level of the member 116 of the audience, e.g., the member of the audience whose location corresponds to the first portion 112 of the media content item. In some implementations, the audience engagement data corresponds to the engagement level of a different member of the audience, e.g., an audience member 122. The electronic device 100 may monitor respective engagement levels of a plurality of members of the audience. For example, the electronic device 100 may monitor respective engagement levels of each member of the audience. In some implementations, the electronic device 100 uses the monitored engagement levels to select locations for displaying subsequent portions of the media content item.

Figure 1C:
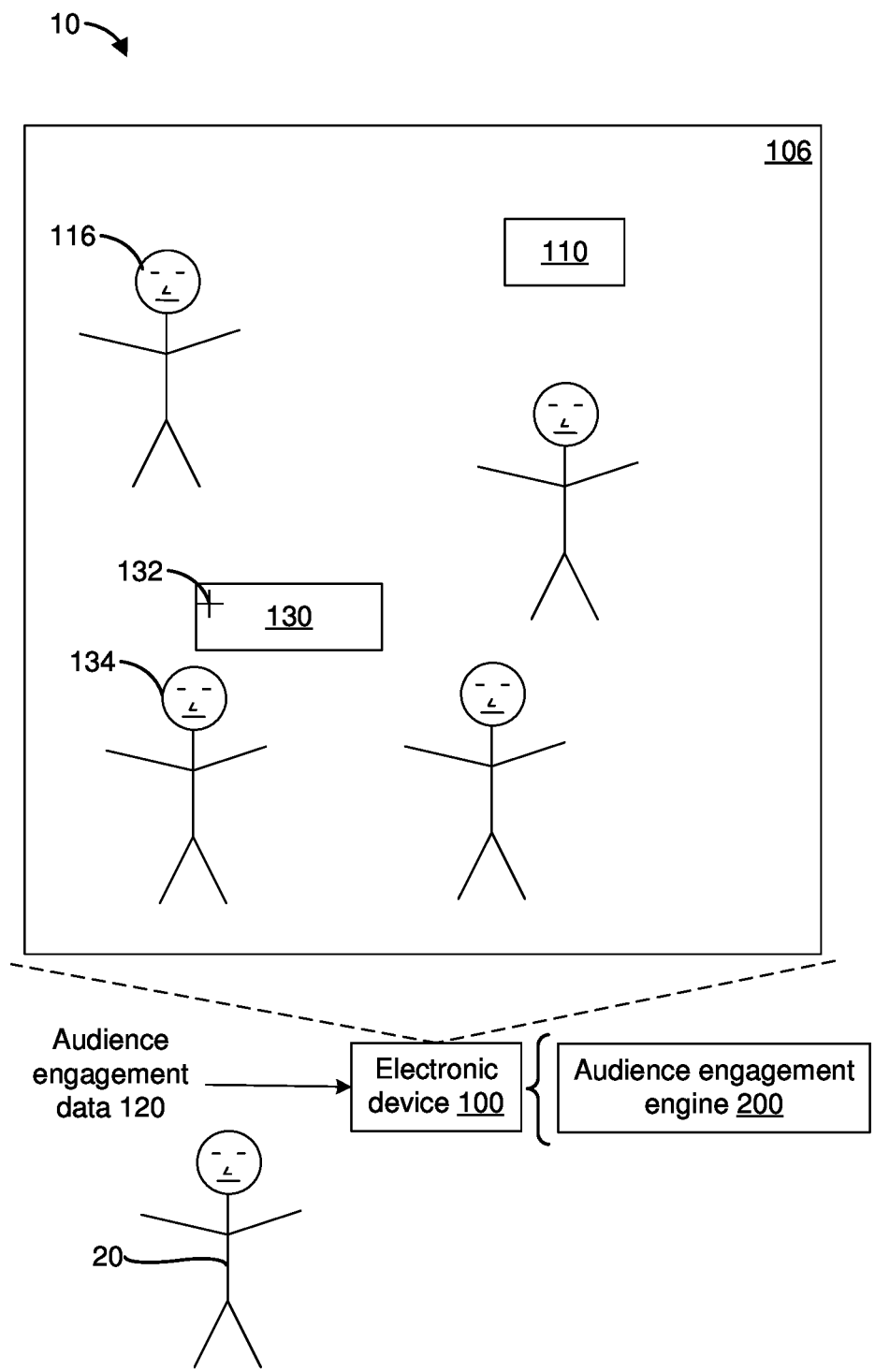

In various implementations, as represented in FIG. 1C, the electronic device 100 (e.g., the audience engagement engine 200) displays a second portion 130 of the media content item at a second location 132 in the field of view of the user 20. The second portion 130 may comprise an image or a text portion (e.g., notes) that prompts the user 20 to speak a second portion of a prepared lecture. In some implementations, the electronic device 100 displays an animation of the first portion 112 from the first location 114 to the second location 132 to provide the user 20 with a continuous view of the media content item. This may avoid the need for the user to search for the second location 132. The electronic device 100 may then display the second portion 130 of the media content item at the second location 132. In some implementations, the second portion 130 is the same as the first portion 112, but displayed at the second location 132. The electronic device 100 selects the second location 132 based on the audience engagement data 120. In some implementations, the electronic device 100 selects the second location 132 based on a location of a member 134 of the audience. The electronic device 100 may determine the location of the member 134 of the audience based on an image representing the audience. The electronic device 100 may determine that a subset of the pixels represents the member 134 of the audience and may select the second location 132 based on the location of the subset of pixels. In some implementations, the electronic device 100 selects the member 134 of the audience based on the audience engagement data 120. For example, the electronic device 100 may select a member of the audience who has an audience engagement value that breaches (e.g., is greater than or less than) a threshold. As another example, the electronic device 100 may select a member of the audience who has an audience engagement value that is greater than or less than the audience engagement values of other members of the audience. As another example, the electronic device 100 may select a member of the audience who has an audience engagement value that is increasing or decreasing.

Figure 1D:
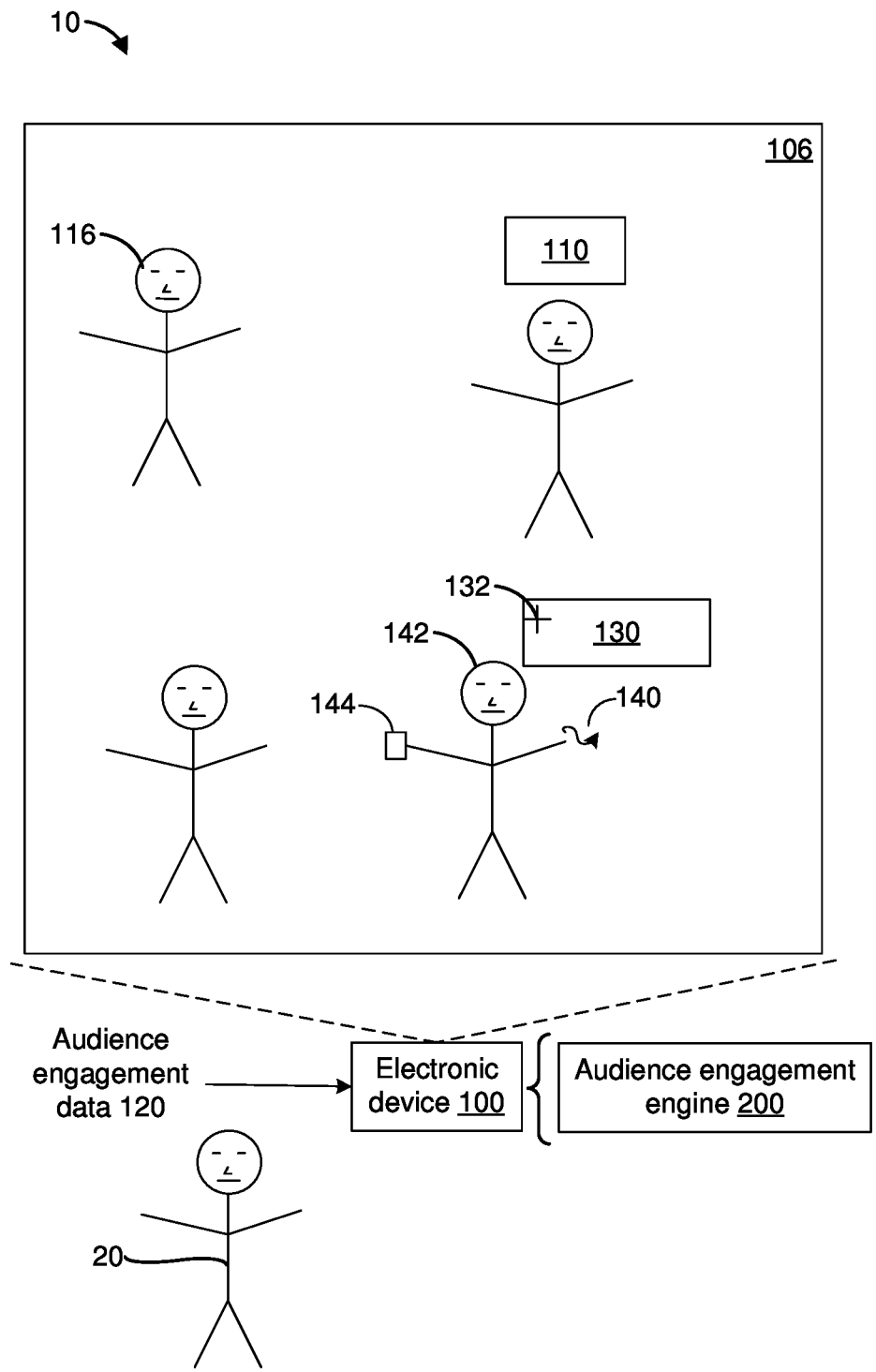

In some implementations, as represented in FIG. 1D, the electronic device 100 (e.g., the audience engagement engine 200) selects the second location 132 for displaying the second portion 130 of the media content item based on an attention indicator 140 that is associated with a particular member 142 of the audience. The attention indicator 140 may include a gesture performed by the member 142. In some implementations, the attention indicator 140 includes a facial expression exhibited by the member 142. In some implementations, the attention indicator 140 includes an audio indicator, such as an utterance performed by the member 142. The electronic device 100 may detect the attention indicator 140 using an image sensor and/or an audio sensor. In some implementations, the electronic device 100 receives the attention indicator 140 from a user input device 144, such as a keyboard, a mouse, a stylus, and/or a touch-sensitive display. In some implementations, the electronic device 100 selects the member 142 and the second location 132 for displaying the second portion 130 of the media content item based on the attention indicator 140.

Figure 1E:
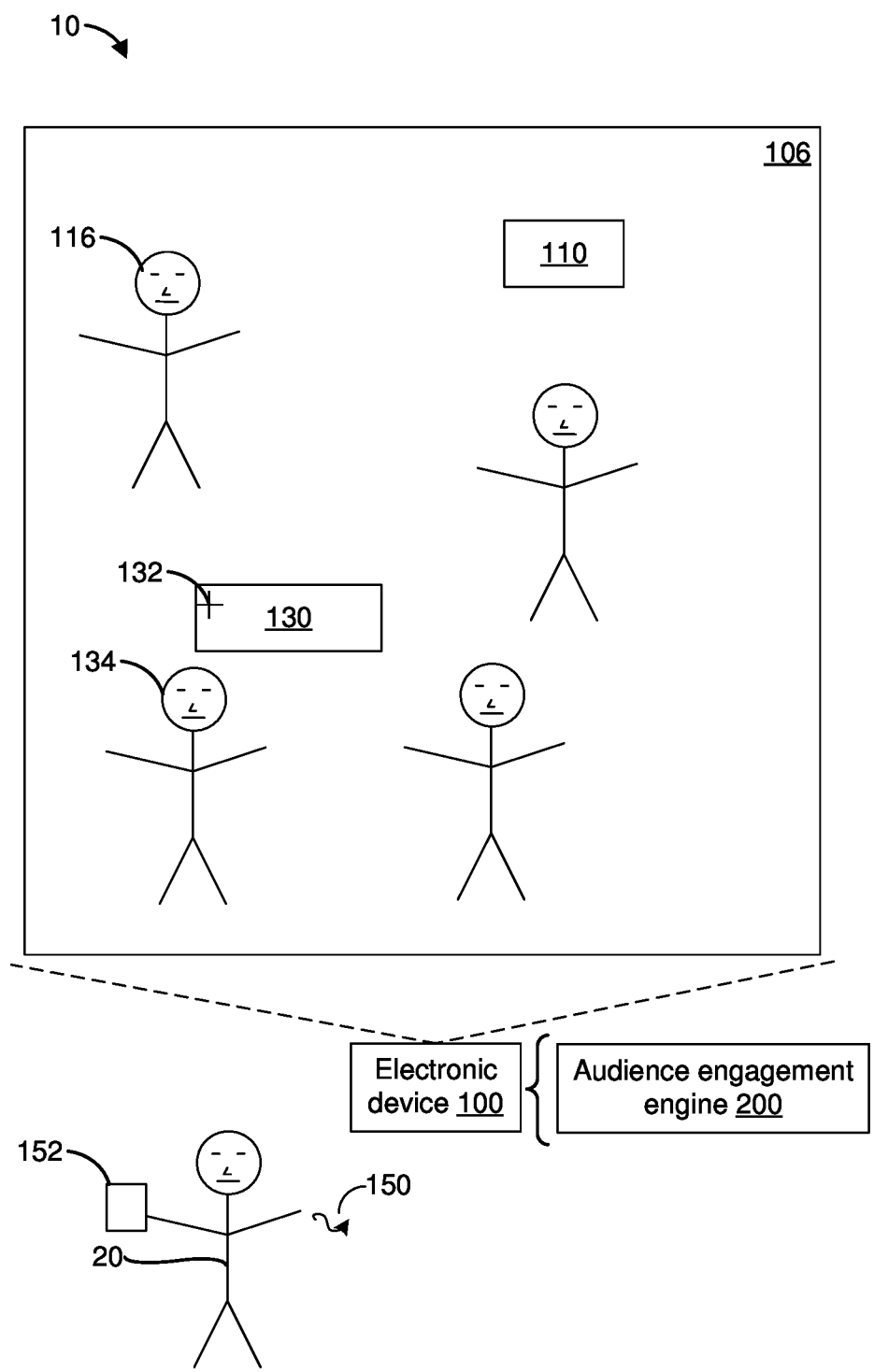

In some implementations, as represented in FIG. 1E, the electronic device 100 (e.g., the audience engagement engine 200) synchronizes the display of the second portion 130 of the media content item with a user input 150 received from the user 20. For example, the second portion 130 of the media content item may be displayed when a defined gesture is performed by the user 20. The user input 150 may include a gesture performed by the user 20. In some implementations, the user input 150 includes an audio input, such as an utterance performed by the user 20. The electronic device 100 may detect the user input 150 using an image sensor and/or an audio sensor. In some implementations, the electronic device 100 receives the user input 150 from a user input device 152, such as a keyboard, a mouse, a stylus, a presenter device, and/or a touch-sensitive display integrated in the electronic device 100.

Figure 1F:
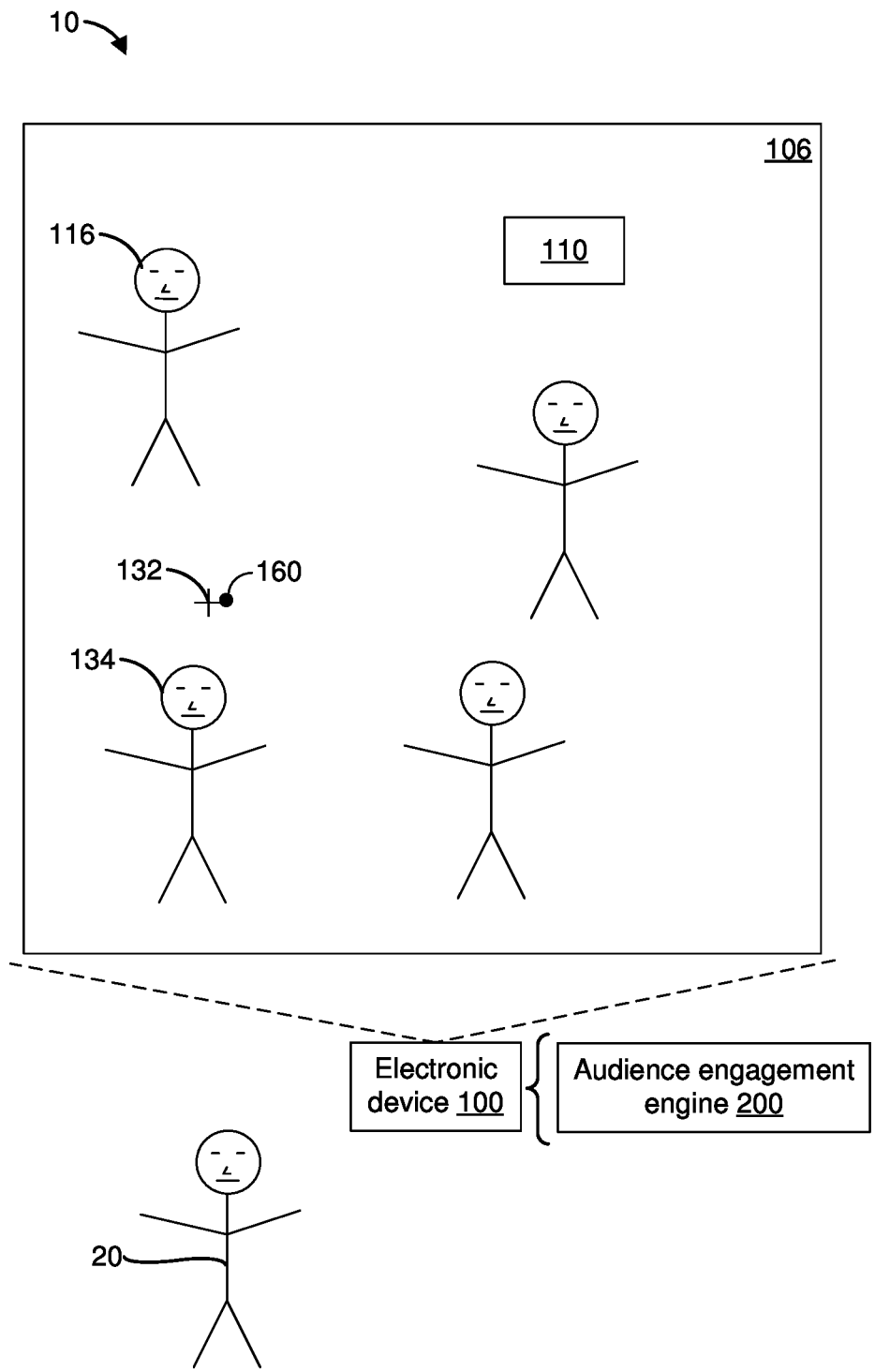

In some implementations, as represented in FIG. 1F, the electronic device 100 (e.g., the audience engagement engine 200) causes an indicator of the second location 132 to be displayed before displaying the second portion 130 of the media content item. For example, the electronic device 100 may cause an affordance 160 (e.g., a dot) to be displayed at the second location 132 before the second portion 130 is displayed. In some implementations, the affordance 160 is implemented as an arrow displayed at the first location 114 and pointing toward the second location 132. Displaying the affordance 160 may allow the user 20 to look at the second location 132 before the second portion 130 is displayed.

Figure 1G:
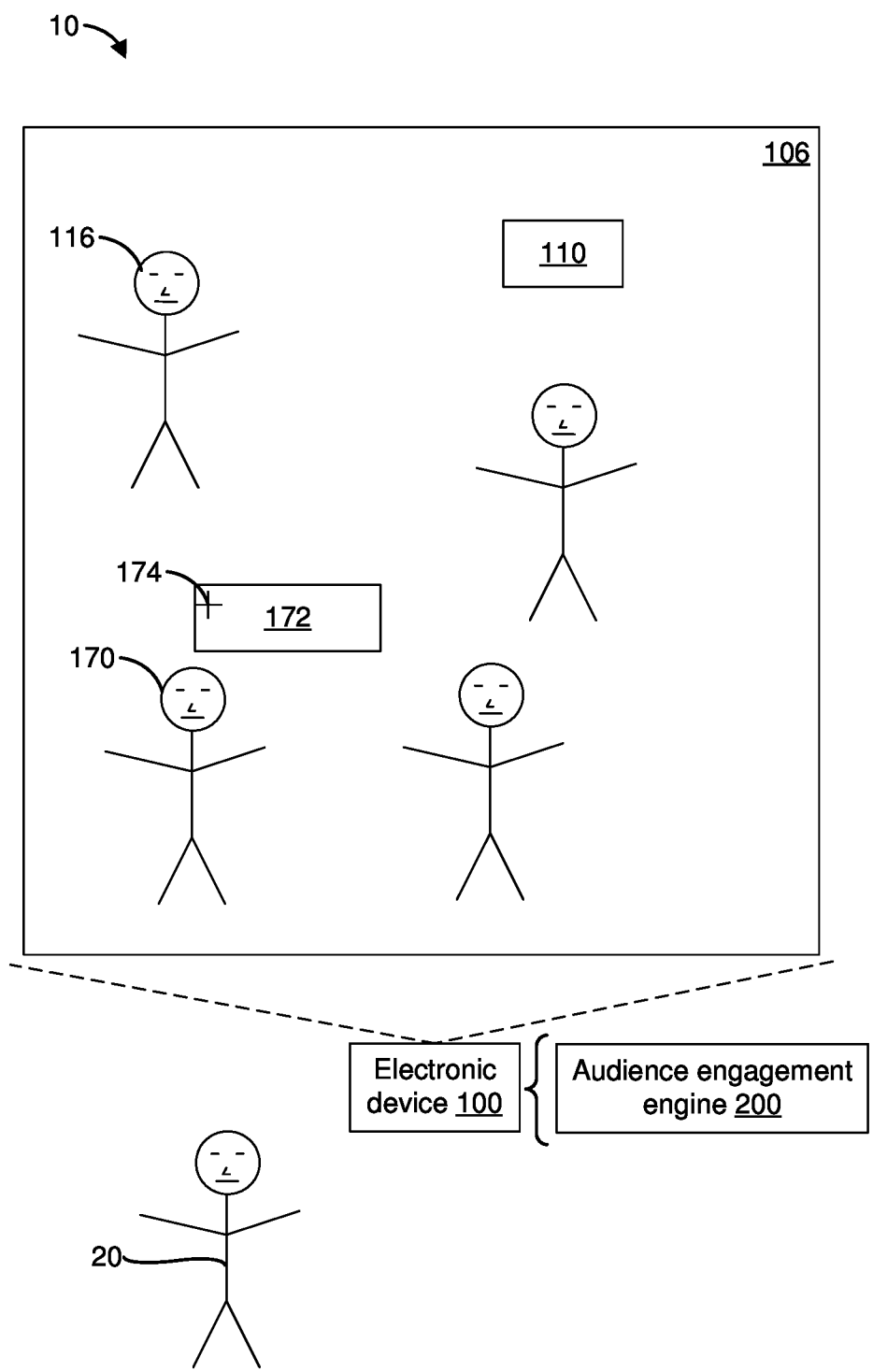

In some implementations, as represented in FIG. 1G, the electronic device 100 (e.g., the audience engagement engine 200) identifies a particular member 170 of the audience. For example, the electronic device 100 may use image recognition techniques and/or speech recognition techniques to associate a subset of pixels in an image and/or audio signal data with a personal identifier that identifies the member 170. In some implementations, the electronic device 100 causes an identifier 172 associated with the member 170 to be displayed at a third location 174 in the field of view of the user. The identifier 172 may include a name of the member 170. The identifier 172 may include contact information associated with the member 170, such as an email address, a phone number, and/or a social media identifier associated with the member 170. The third location 174 may be near the representation of the member 170, as shown in FIG. 1G, or may be elsewhere in the field of view.

In some implementations, the electronic device 100 includes or is attached to a head-mountable device (HMD) that can be worn by the user 20. The HMD presents (e.g., displays) the XR environment 106 according to various implementations. In some implementations, the HMD includes an integrated display (e.g., a built-in display) that displays the XR environment 106. In some implementations, the HMD includes a head-mountable enclosure. In various implementations, the head-mountable enclosure includes an attachment region to which another device with a display can be attached. For example, in some implementations, the electronic device 100 can be attached to the head-mountable enclosure. In various implementations, the head-mountable enclosure is shaped to form a receptacle for receiving another device that includes a display (e.g., the electronic device 100). For example, in some implementations, the electronic device 100 slides/snaps into or otherwise attaches to the head-mountable enclosure. In some implementations, the display of the device attached to the head-mountable enclosure presents (e.g., displays) the XR environment 106. In various implementations, examples of the electronic device 100 include smartphones, tablets, media players, laptops, etc.

Figure 2:
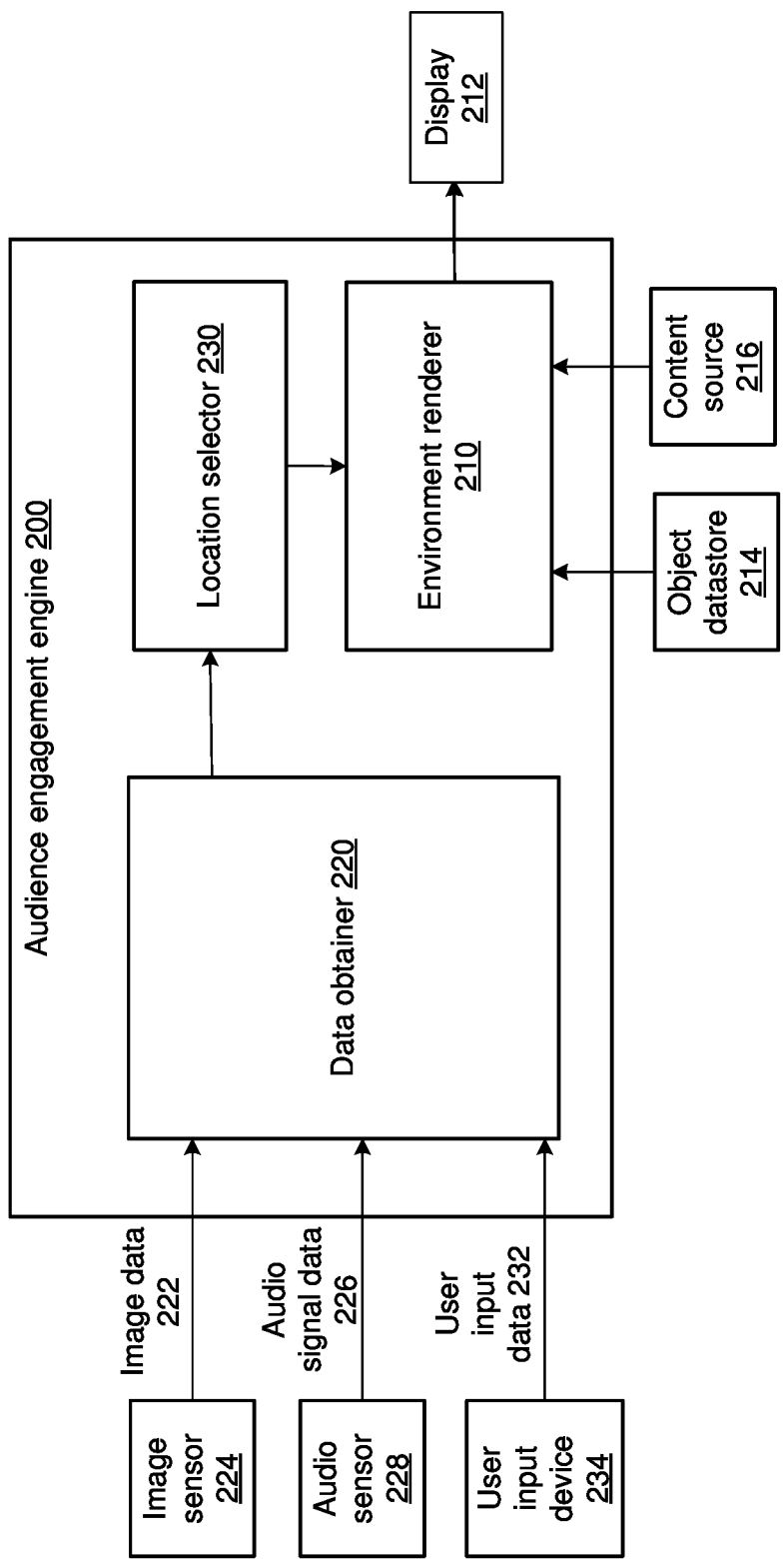
FIG. 2 is a block diagram of an example audience engagement engine in accordance with some implementations.

FIG. 2 illustrates a block diagram of the audience engagement engine 200 in accordance with some implementations. In some implementations, the audience engagement engine 200 includes an environment renderer 210, a data obtainer 220, and a location selector 230. In various implementations, the environment renderer 210 displays an extended reality (XR) environment that includes one or more virtual objects in a field of view. For example, with reference to FIG. 1A, the environment renderer 210 may display the XR environment, including the XR object 110, on a display 212. In various implementations, the environment renderer 210 obtains the virtual objects from an object datastore 214. The virtual objects may represent physical articles. For example, in some implementations, the virtual objects represent equipment (e.g., machinery such as planes, tanks, robots, motorcycles, etc.). In some implementations, the virtual objects represent fictional elements.

In some implementations, the environment renderer 210 causes a first portion of a media content item corresponding to a presentation to be displayed on the display 212, e.g., by modifying the XR environment to include a representation of the first portion of the media content item. The environment renderer 210 may obtain the media content item from a content source 216. The first portion of the media content item is displayed at a first location in a field of view of the user. In some implementations, the location selector 230 selects the first location based on a location of a member of an audience. The data obtainer 220 may obtain image data 222 representing the audience from an image sensor 224. In some implementations, the location selector 230 determines that a subset of pixels in the image data 222 represents a member of the audience and may select the first location based on the location of the subset of pixels.

In various implementations, the data obtainer 220 receives audience engagement data that corresponds to an engagement level of a member of the audience. The audience engagement data may include the image data 222 from the image sensor 224. For example, the data obtainer 220 may process the image data 222 to derive data indicative of facial expressions and/or body poses exhibited by members of the audience. In some implementations, the audience engagement data includes audio signal data 226 received from an audio sensor 228. For example, the data obtainer may process the audio signal data 226 to derive data indicative of utterances exhibited by members of the audience. In some implementations, the audience engagement data includes user input data 232 received from a user input device 234, such as a keyboard, a mouse, a stylus, or a touch-sensitive display.

The audience engagement data may correspond to the engagement level of the member of the audience whose location corresponds to the first portion of the media content item. In some implementations, the audience engagement data corresponds to the engagement level of a different member of the audience. The data obtainer 220 may monitor respective engagement levels of a plurality of members of the audience. For example, the data obtainer 220) may monitor respective engagement levels of each member of the audience. In some implementations, the location selector 230 uses the monitored engagement levels to select locations for displaying subsequent portions of the media content item.

In some implementations, the environment renderer 210 displays a second portion of the media content item at a second location in the field of view of the user. The location selector 230 may select the second location based on the audience engagement data. For example, in some implementations, the location selector 230 selects the second location based on a location of a second member of the audience that is selected based on the audience engagement data. The location selector 230 may select a member of the audience who has an audience engagement value that breaches (e.g., is greater than or less than) a threshold (e.g., a member of the audience who appears distracted, confused or bored). In some implementations, the location selector 230 selects a member of the audience who has an audience engagement value that is greater than or less than the audience engagement values of other members of the audience (e.g., a member of the audience who appears more distracted, more confused or more bored than other members of the audience). In some implementations, the location selector 230 selects a member of the audience who has an audience engagement value that is increasing or decreasing, e.g., at greater than a threshold rate. In some implementations, the location selector 230 selects the second location based on an amount of time that the user has presented at a particular location and/or an amount of time that the user has directed a gaze at a particular location. For example, the location selector 230 may select the second location so as to avoid the appearance of focusing the user's attention on a particular portion of the audience disproportionately.

The location selector 230 may determine the location of the selected member of the audience based on an image representing the audience. For example, the location selector 230 may determine that a subset of the pixels of the image represents the selected member of the audience. The location selector 230 may select the second location based on the location of the subset of the pixels that represents the selected member of the audience. In some implementations, the location selector 230 sends the selected second location to the environment renderer 210. The environment renderer 210 modifies the XR environment to include a representation of the second portion of the media content item at the second location in the field of view of the user.

In some implementations, the data obtainer 220 obtains data corresponding to an attention indicator that is associated with a particular member of the audience. For example, the data obtainer 220 may obtain image data 222 that corresponds to a gesture or a facial expression exhibited by a member of the audience (e.g., the gesture and/or the facial expression may indicate whether the member is distracted, confused or bored). As another example, the data obtainer 220 may obtain audio signal data 226 that corresponds to an utterance uttered by a member of the audience (e.g., a sigh, a yawn, etc.). In some implementations, the data obtainer 220 obtains user input data 232 corresponding to an attention indicator from the user input device 234. The location selector 230 may select a second location corresponding to a member associated with the attention indicator.

In some implementations, the environment renderer 210 synchronizes the display of the second portion of the media content item with a user input obtained, e.g., from the data obtainer 220. For example, the image data 222 may correspond to a gesture performed by the user. As another example, the audio signal data 226 may correspond to an utterance uttered by the user, such as a keyword (e.g., "next"). In some implementations, the data obtainer 220) obtains the user input data 232 for synchronizing the display of the second portion of the media content item from the user input device 234.

In some implementations, the environment renderer 210 causes an indicator of the second location to be displayed before displaying the second portion of the media content item. For example, the environment renderer 210 may modify the XR environment to include an affordance (e.g., a dot) that is displayed at the second location before the second portion of the media content item is displayed. In some implementations, the environment renderer 210) modifies the XR environment to include an arrow displayed at the first location and pointing toward the second location. Displaying the affordance may allow the user to look at the second location before the second portion of the media content item is displayed. In some implementations, the environment renderer 210) causes an animation of the first portion of the media content item from the first location to the second location to be displayed. The environment renderer 210) may or may not cause the content of the displayed portion of the media content item to be updated from the first portion to the second portion as the animation is displayed.

In some implementations, the environment renderer 210 causes an identifier of a particular member of the audience to be displayed in the XR environment. For example, the data obtainer 220 may use image recognition techniques and/or speech recognition techniques to associate a subset of pixels in the image data 222 and/or the audio signal data 226 with a personal identifier that identifies the member of the audience. In some implementations, the environment renderer 210 modifies the XR environment to include an identifier associated with the member that is displayed at a third location in the field of view of the user. The identifier may include a name of the member. The identifier may include contact information associated with the member, such as an email address, a phone number, and/or a social media identifier associated with the member. The third location may be near the representation of the member or may be elsewhere in the field of view.

Figure 3A:
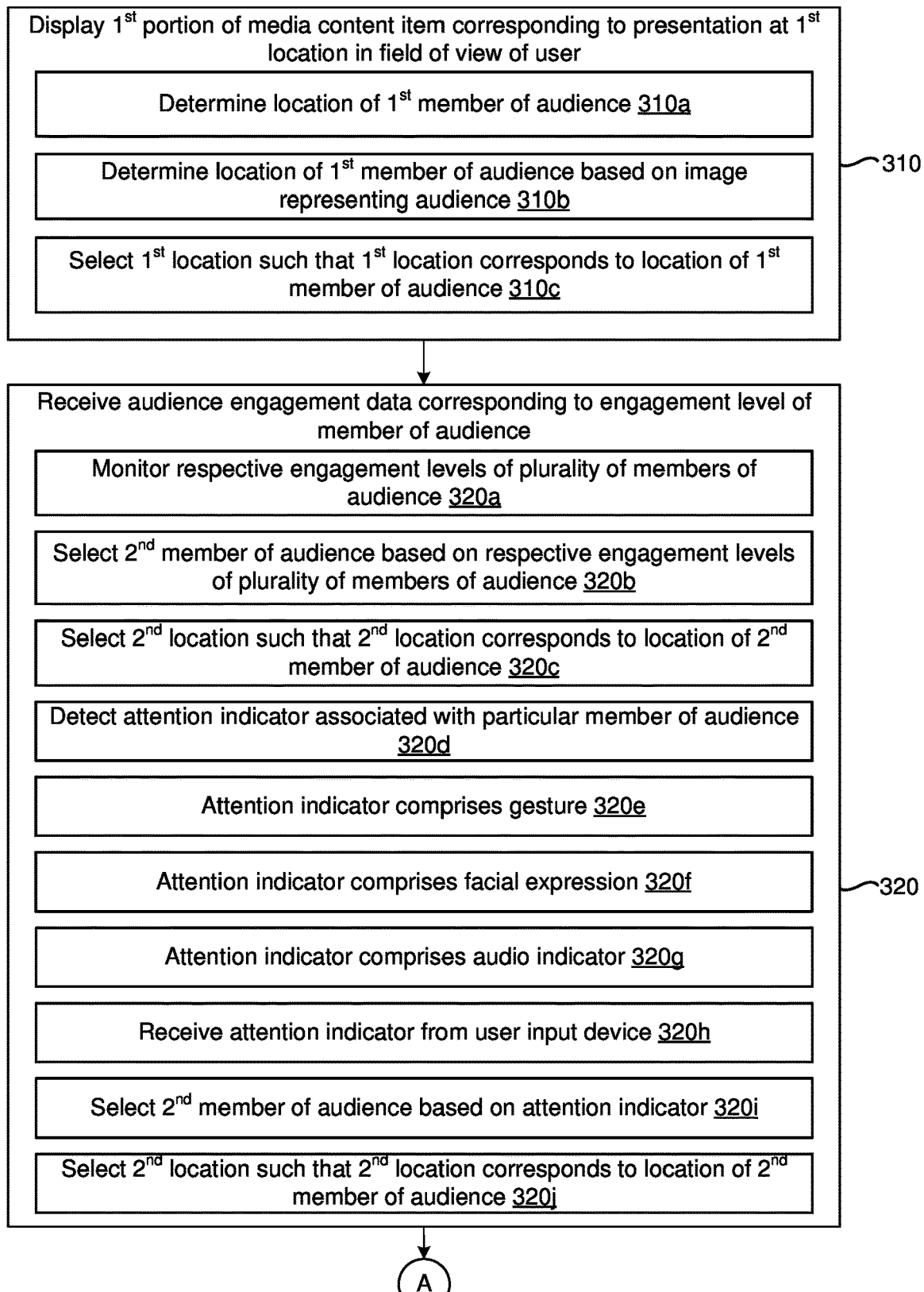
FIGS. 3A-3B are a flowchart representation of a method of displaying presentation notes at varying positions within a presenter's field of view in accordance with some implementations.
Figure 3B:
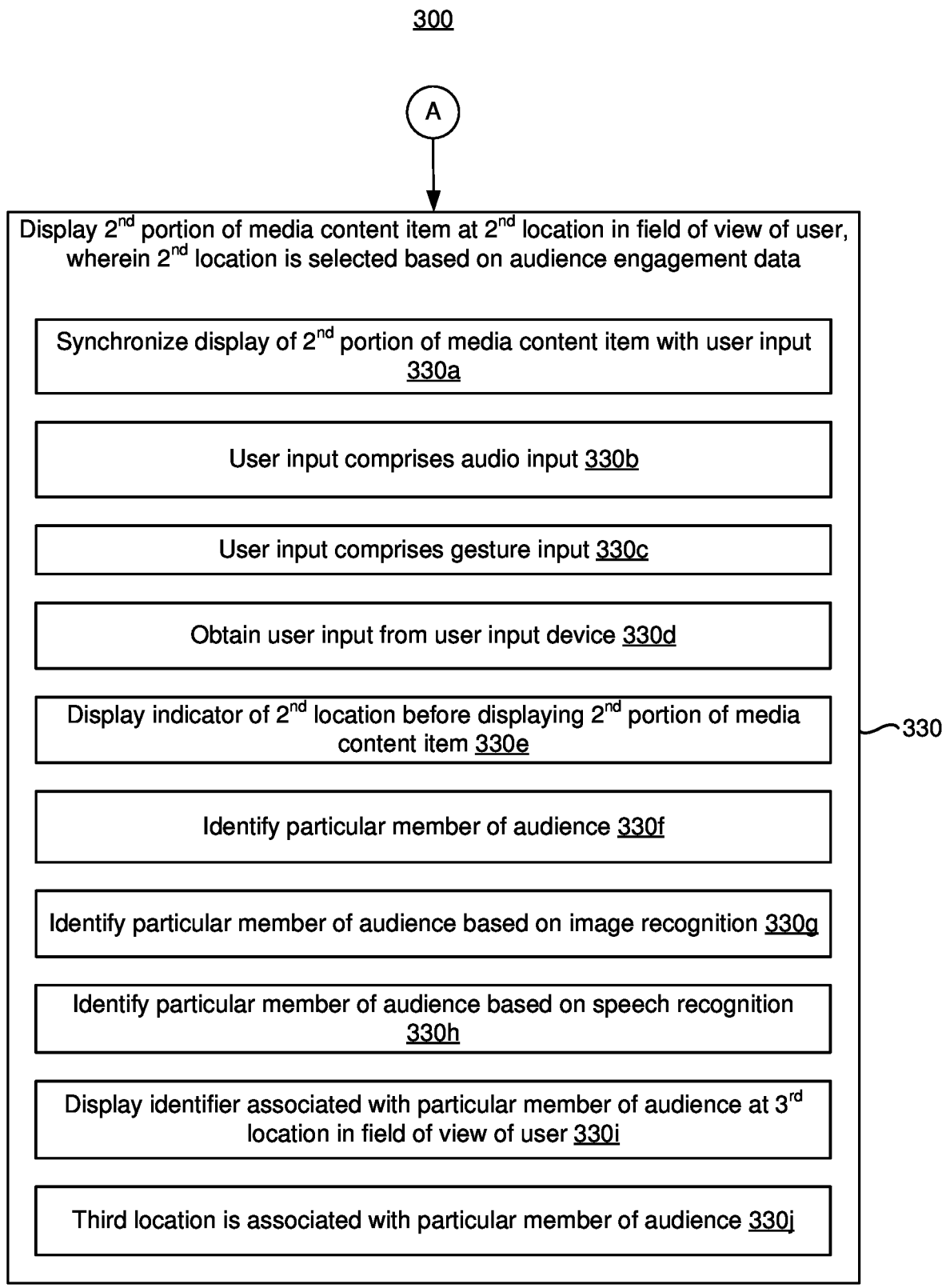

FIGS. 3A-3B are a flowchart representation of a method 300 for displaying presentation notes at varying positions within a presenter's field of view in accordance with various implementations. In various implementations, the method 300 is performed by a device (e.g., the electronic device 100 shown in FIGS. 1A-1G, or the audience engagement engine 200 shown in FIGS. 1A-1G and 2). In some implementations, the method 300 is performed by processing logic, including hardware, firmware, software, or a combination thereof. In some implementations, the method 300 is performed by a processor executing code stored in a non-transitory computer-readable medium (e.g., a memory).

In various implementations, an XR environment comprising (e.g., corresponding to) a field of view is displayed. In some implementations, the XR environment is generated. In some implementations, the XR environment is received from another device that generated the XR environment.

The XR environment may include a virtual environment that is a simulated replacement of a physical environment. In some implementations, the XR environment is synthesized and is different from a physical environment in which the electronic device is located. In some implementations, the XR environment includes an augmented environment that is a modified version of a physical environment. For example, in some implementations, the electronic device modifies the physical environment in which the electronic device is located to generate the XR environment. In some implementations, the electronic device generates the XR environment by simulating a replica of the physical environment in which the electronic device is located. In some implementations, the electronic device removes and/or adds items from the simulated replica of the physical environment in which the electronic device is located to generate the XR environment.

In some implementations, the electronic device includes a head-mountable device (HMD). The HMD may include an integrated display (e.g., a built-in display) that displays the XR environment. In some implementations, the HMD includes a head-mountable enclosure. In various implementations, the head-mountable enclosure includes an attachment region to which another device with a display can be attached. In various implementations, the head-mountable enclosure is shaped to form a receptacle for receiving another device that includes a display. In some implementations, the display of the device attached to the head-mountable enclosure presents (e.g., displays) the XR environment. In various implementations, examples of the electronic device include smartphones, tablets, media players, laptops, etc.

Briefly, the method 300 includes displaying a first portion of a media content item corresponding to a presentation at a first location in a user's field of view and receiving audience engagement data that corresponds to an engagement level of a member of an audience. A second portion of the media content item is displayed at a second location in the user's field of view. The second location is selected based on the audience engagement data.

In various implementations, as represented by block 310, the method 300 includes displaying a first portion of a media content item corresponding to a presentation at a first location in a three-dimensional environment, e.g., over a view of an audience. For example, overlaying presentation notes onto a first location within a pass-through of a physical environment that includes the audience. In some implementations, the first location is selected based on a location of a member of the audience. For example, a first presentation note is overlaid adjacent to a first audience member's face. As represented by block 310a, the method 300 may include determining the location of a first member of the audience. In some implementations, as represented by block 310b, the location of the first member of the audience may be determined based on an image representing the audience. For example, the electronic device 100 may incorporate an image sensor that captures an image comprising a plurality of pixels. The electronic device 100 may determine that a subset of the pixels represents the first member of the audience. As represented by block 310c, in some implementations, the electronic device 100 selects the first location based on the location of the subset of pixels that represents the first member of the audience.

In various implementations, as represented by block 320, the method 300 includes receiving audience engagement data that corresponds to an engagement level of a member of an audience in the three-dimensional environment. The audience engagement data may include image data received from an image sensor, audio signal data received from an audio sensor, user input data received from a user input device, and the like. For example, an image sensor may receive image data that is processed to derive data indicative of facial expressions and/or body poses exhibited by members of the audience. As another example, an audio sensor may receive audio signal data that is processed to derive data indicative of utterances uttered by members of the audience. In some implementations, the audience engagement data corresponds to the engagement level of the member of the audience whose location corresponds to the first portion of the media content item. In some implementations, the audience engagement data corresponds to the engagement level of a different member of the audience. In some implementations, as represented by block 320a, the method 300 includes monitoring respective engagement levels of a plurality of members of the audience (e.g., each member of the audience).

The electronic device 100 may use the monitored engagement levels to select locations for displaying subsequent portions of the media content item (e.g., subsequent presentation notes). For example, as represented by block 320b, a second member of the audience may be selected based on the respective engagement levels of a plurality of members of the audience. In some implementations, for example, audience engagement levels may be used to facilitate selecting a member of the audience who has an audience engagement value that breaches (e.g., is greater than or less than) a threshold. In some implementations, a member of the audience who has an audience engagement value that is greater than or less than the audience engagement values of other members of the audience is selected (e.g., selecting the most confused audience member, the most distracted audience member or the most bored audience member). In some implementations, a member of the audience who has an audience engagement value that is greater than or less than a member of the audience associated with the first location may be selected (e.g., selecting a member who is talking more than a member associated with the first location). In some implementations, the method 300 includes selecting a member of the audience who has an audience engagement value that is increasing or decreasing (e.g., a member who is talking more than a few minutes ago or a member who is less engaged than a few minutes ago). As represented by block 320c, a second location for displaying the second portion of the media content item may be selected to correspond to the location of the second member of the audience.

In some implementations, as represented by block 320d, an attention indicator associated with a particular member of the audience is detected. As represented by block 320e, the attention indicator may include a gesture. In some implementations, as represented by block 320f, the attention indicator includes a facial expression. In some implementations, as represented by block 320g, the attention indicator includes an audio indicator, such as an utterance. The electronic device 100 may detect the attention indicator using an image sensor and/or an audio sensor. In some implementations, as represented by block 320h, the electronic device 100 receives the attention indicator from a user input device, such as a keyboard, a mouse, a stylus, and/or a touch-sensitive display. In some implementations, as represented by block 320i, the method 300 includes selecting the second member of the audience based on the attention indicator. As represented by block 320j, the second location may be selected to correspond to the location of the second member of the audience.

In various implementations, as represented by block 330 on FIG. 3B, the method 300 includes displaying a second portion of the media content item at a second location in the three-dimensional environment. The second location is selected based on the audience engagement data. For example, as disclosed herein, the electronic device 100 may select a second member of the audience based on the audience engagement data, e.g., to increase audience engagement with the audience as a whole and/or with particular audience members. The second location may be selected to correspond to the location of the second member of the audience so that when the second portion of the media content item is displayed at the second location in the field of view of the user, the user appears to look toward the second member of the audience. In various implementations, the first location and the second location are within a field of view of a user of the device.

In some implementations, as represented by block 330a, the display of the second portion of the media content item is synchronized with a user input. For example, the user input may be used to advance between slides in a presentation. In some implementations, as represented by block 330b, the user input includes an audio input. For example, the user may utter a phrase, such as "next," to advance between slides. In some implementations, as represented by block 330c, the user input includes a gesture input. For example, the electronic device 100 may include an image sensor that obtains image data corresponding to a gesture performed by the user. In some implementations, as represented by block 330d, the user input is obtained from a user input device, such as a keyboard, a mouse, a stylus, a presenter device, and/or a touch-sensitive display integrated in the electronic device 100.

In some implementations, as represented by block 330e, the method 300 includes displaying an indicator of the second location before displaying the second portion of the media content item. For example, an affordance (e.g., a dot) may be displayed at the second location before the second portion of the media content item is displayed. In some implementations, an arrow affordance is displayed at the first location and points toward the second location. The affordance may allow the user to look at the second location before the second portion of the media content item is displayed.

In some implementations, as represented by block 330f, the method 300 includes identifying a particular member of the audience. For example, as represented by block 330g, the particular member of the audience may be identified by image recognition. In some implementations, as represented by block 330h, the particular member of the audience is identified based on speech recognition. As represented by block 330i, the electronic device 100 may cause an identifier associated with the particular member to be displayed at a third location in the field of view of the user. The identifier may include a name of the particular member. The identifier may include contact information associated with the particular member, such as an email address, a phone number, and/or a social media identifier associated with the particular member. The third location may be near the representation of the particular member, as represented by block 330j.

In various implementations, the method 300 includes overlaying presentation notes for a first presentation slide on a pass-through representation of a physical environment with an audience. The presentation notes for the first presentation slide are overlaid adjacent to a face of a first person in order to provide an appearance that the user is looking at the first person while reading the presentation notes for the first presentation slide. In some implementations, the method 300 includes identifying a second person in the audience based on audience engagement data, and overlaying presentation notes for a second presentation slide adjacent to a face of the second person in order to provide an appearance that the user is looking at the second person while reading the presentation notes for the second presentation slide. As described herein, the audience engagement data may indicate that the second person is more distracted than the first person (e.g., the second person may be chatting with nearby audience members). As such, displaying the presentation notes for the second presentation slide adjacent to the face of the second person provides an appearance that the user is looking at the second person and may increase an engagement of the second person (e.g., the second person may stop talking with nearby audience members if the user appears to be looking at the second person).

Figure 4:
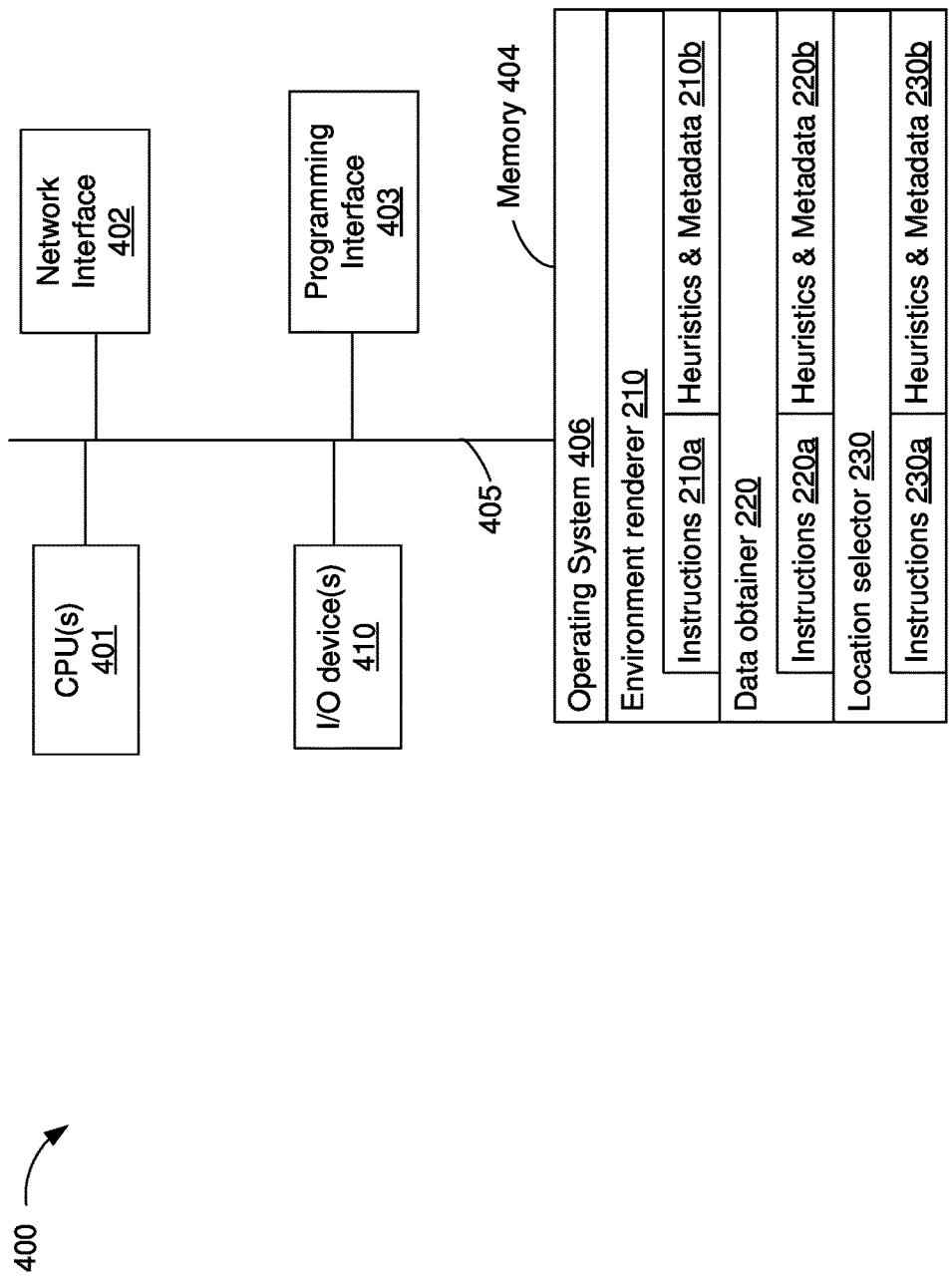
FIG. 4 is a block diagram of a device that displays presentation notes at varying positions within a presenter's field of view in accordance with some implementations.

FIG. 4 is a block diagram of a device 400 in accordance with some implementations. In some implementations, the device 400 implements the electronic device 100 shown in FIGS. 1A-1G, and/or the audience engagement engine 200 shown in FIGS. 1A-1G and 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 410, and one or more communication buses 405 for interconnecting these and various other components.

In some implementations, the network interface 402 is provided to, among other uses, establish and/or maintain a metadata tunnel between a cloud hosted network management system and at least one private network including one or more compliant devices. In some implementations, the one or more communication buses 405 include circuitry that interconnects and/or controls communications between system components. In some implementations, the memory 404 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. The memory 404 may include one or more storage devices remotely located from the one or more CPUs 401. The memory 404 includes a non-transitory computer readable storage medium.

In some implementations, the memory 404 or the non-transitory computer readable storage medium of the memory 404 stores the following programs, modules and data structures, or a subset thereof including an optional operating system 406, the environment renderer 210, the data obtainer 220, and the location selector 230. In various implementations, the device 400 performs the method 300 shown in FIGS. 3A-3B.

In some implementations, the environment renderer 210 displays an extended reality (XR) environment that includes one or more virtual objects in a field of view. In some implementations, the environment renderer 210 performs some operation(s) represented by block 310 and 330 in FIGS. 3A-3B. To that end, the environment renderer 210 includes instructions 210*a* and heuristics and metadata 210*b*.

In some implementations, the data obtainer 220 receives audience engagement data that corresponds to an engagement level of a member of the audience. In some implementations, the data obtainer 220 performs the operation(s) represented by block 320 in FIGS. 3A-3B. To that end, the data obtainer 220 includes instructions 220*a* and heuristics and metadata 220*b*.

In some implementations, the location selector 230 selects locations for displaying portions of a media content item corresponding to a presentation based on the audience engagement data. In some implementations, the location selector 230 performs the operations represented by block 330 in FIGS. 3A-3B. To that end, the location selector 230 includes instructions 230*a* and heuristics and metadata 230*b*.

In some implementations, the one or more I/O devices 410 include a user-facing image sensor. In some implementations, the one or more I/O devices 410 include one or more head position sensors that sense the position and/or motion of the head of the user. In some implementations, the one or more I/O devices 410 include a display for displaying the graphical environment (e.g., for displaying the XR environment 106). In some implementations, the one or more I/O devices 410 include a speaker for outputting an audible signal.

In various implementations, the one or more I/O devices 410 include a video pass-through display which displays at least a portion of a physical environment surrounding the device 400 as an image captured by a scene camera. In various implementations, the one or more I/O devices 410 include an optical see-through display which is at least partially transparent and passes light emitted by or reflected off the physical environment.

FIG. 4 is intended as a functional description of various features which may be present in a particular implementation as opposed to a structural schematic of the implementations described herein. Items shown separately could be combined and some items could be separated. For example, some functional blocks shown separately in FIG. 4 could be implemented as a single block, and various functions of single functional blocks may be implemented by one or more functional blocks in various implementations. The actual number of blocks and the division of particular functions and how features are allocated among them can vary from one implementation to another and, in some implementations, may depend in part on the particular combination of hardware, software, and/or firmware chosen for a particular implementation.

The described technology may gather and use information from various sources. This information may, in some instances, include personal information that identifies or may be used to locate or contact a specific individual. This personal information may include demographic data, location data, telephone numbers, email addresses, date of birth, social media account names, work or home addresses, data or records associated with a user's health or fitness level, or other personal or identifying information.

The collection, storage, transfer, disclosure, analysis, or other use of personal information should comply with well-established privacy policies or practices. Privacy policies and practices that are generally recognized as meeting or exceeding industry or governmental requirements should be implemented and used. Personal information should be collected for legitimate and reasonable uses and not shared or sold outside of those uses. The collection or sharing of information should occur after receipt of the user's informed consent.

It is contemplated that, in some instances, users may selectively prevent the use of, or access to, personal information. Hardware or software features may be provided to prevent or block access to personal information. Personal information should be handled to reduce the risk of unintentional or unauthorized access or use. Risk can be reduced by limiting the collection of data and deleting the data once it is no longer needed. When applicable, data de-identification may be used to protect a user's privacy.

Although the described technology may broadly include the use of personal information, it may be implemented without accessing such personal information. In other words, the present technology may not be rendered inoperable due to the lack of some or all of such personal information.

Various aspects of implementations within the scope of the appended claims are described above. However, it should be apparent that the various features of implementations described above may be embodied in a wide variety of forms and that any specific structure and/or function described above is merely illustrative. Based on the present disclosure, one skilled in the art should appreciate that an aspect described herein may be implemented independently of other aspects and that two or more aspects described herein may be combined in various ways. For example, an apparatus may be implemented and/or a method may be practiced using a number of the aspects set forth herein. Additionally, such an apparatus may be implemented and/or such a method may be practiced using other structure and/or functionality in addition to or other than one or more of the aspects set forth herein.

What is claimed is:

1. A method comprising:
    at a device comprising a display, one or more processors, and a memory:
        acquiring a media content item corresponding to a presentation, the media content item including a first portion followed by a second portion in a predefined sequence associated with the presentation;
        displaying the first portion of the media content item at a first location in a three-dimensional environment;
        receiving audience engagement data corresponding to an engagement level of a member of an audience in the three-dimensional environment;

determining a second location in the three-dimensional environment, wherein the second location is selected based on the audience engagement data; and displaying the second portion of the media content item at the second location.

2. The method of claim 1, further comprising:

determining a location of a first member of the audience based on an image representing the audience; and selecting the first location such that the first location corresponds to the location of the first member of the audience.

3. The method of claim 1, further comprising:

monitoring respective engagement levels of a plurality of members of the audience;

selecting a second member of the audience based on the respective engagement levels of the plurality of members of the audience; and selecting the second location such that the second location corresponds to a location of the second member of the audience.

4. The method of claim 1, further comprising detecting an attention indicator associated with a particular member of the audience, wherein the attention indicator comprises a combination of a gesture, a facial expression and an audio indicator.

5. The method of claim 4, further comprising receiving the attention indicator from a user input device.

6. The method of claim 4, further comprising:

selecting a second member of the audience based on the attention indicator; and selecting the second location such that the second location corresponds to a location of the second member of the audience.

7. The method of claim 1, further comprising synchronizing a display of the second portion of the media content item with a user input, wherein the user input includes an audio input or a gesture input.

8. The method of claim 1, further comprising displaying an indicator of the second location before displaying the second portion of the media content item.

9. The method of claim 1, further comprising:

identifying a particular member of the audience; and displaying an identifier associated with the particular member of the audience at a third location in the three-dimensional environment.

10. The method of claim 9, further comprising identifying the particular member of the audience based on image recognition.

11. The method of claim 9, further comprising identifying the particular member of the audience based on speech recognition.

12. The method of claim 9, wherein the third location is associated with the particular member of the audience.

13. The method of claim 1, wherein the display is located between a user of the device and the audience.

14. The method of claim 1, wherein the device comprises a head-mountable device (HMD).

15. The method of claim 1, wherein the first portion and second portion of the media content item are displayed over a view of the audience.

16. The method of claim 1, wherein the first location and the second location are within a field of view of a user of the device.

17. The method of claim 1, wherein the first portion corresponds to a first slide of the presentation and the second portion corresponds to a second slide of the presentation.

18. A device comprising:

one or more processors;

a non-transitory memory;

a display;

an audio sensor;

an input device; and one or more programs stored in the non-transitory memory, which, when executed by the one or more processors, cause the device to:

acquire a media content item corresponding to a presentation, the media content item including a first portion followed by a second portion in a predefined sequence associated with the presentation;

display the first portion of the media content item at a first location in a three-dimensional environment;

receive audience engagement data corresponding to an engagement level of a member of an audience in the three-dimensional environment;

determine a second location in the three-dimensional environment, wherein the second location is selected based on the audience engagement data; and display the second portion of the media content item at the second location.

19. The device of claim 18, wherein the one or more programs further cause the device to:

determine a location of a first member of the audience based on an image representing the audience; and select the first location such that the first location corresponds to the location of the first member of the audience.

20. A non-transitory memory storing one or more programs, which, when executed by one or more processors of a device, cause the device to:

acquire a media content item corresponding to a presentation, the media content item including a first portion followed by a second portion in a predefined sequence associated with the presentation;

display the first portion of the media content item at a first location in a three-dimensional environment;

receive audience engagement data corresponding to an engagement level of a member of an audience in the three-dimensional environment;

determine a second location in the three-dimensional environment, wherein the second location is selected based on the audience engagement data; and display the second portion of the media content item at the second location.

* * * * *